United States Patent
Belanger et al.

(10) Patent No.: US 7,227,843 B2
(45) Date of Patent: Jun. 5, 2007

(54) METHOD FOR REDUCING CONGESTION IN PACKET-SWITCHED NETWORKS

(75) Inventors: David Gerald Belanger, Hillsborough, NJ (US); Steven Michael Bellovin, Westfield, NJ (US); Ramon Caceres, New York, NY (US); David C. Nagel, Los Gatos, CA (US)

(73) Assignee: AT&T Corp., New York, NY (US)

( * ) Notice: Subject to any disclaimer, the term of this patent is extended or adjusted under 35 U.S.C. 154(b) by 111 days.

(21) Appl. No.: 10/372,624

(22) Filed: Feb. 24, 2003

(65) Prior Publication Data

US 2003/0137938 A1    Jul. 24, 2003

Related U.S. Application Data

(63) Continuation of application No. 09/292,024, filed on Apr. 16, 1999, now abandoned.

(51) Int. Cl.
*H04L 1/00* (2006.01)
*H04L 12/26* (2006.01)

(52) U.S. Cl. .................. 370/237; 370/230.1; 370/231; 370/232

(58) Field of Classification Search ........ 370/229–232, 370/235–238.1, 351, 352, 389, 392
See application file for complete search history.

(56) References Cited

U.S. PATENT DOCUMENTS

| | | | |
|---|---|---|---|
| 4,486,626 A | * | 12/1984 | Kohler ................... 379/196 |
| 5,515,425 A | | 5/1996 | Penzias et al. |
| 5,561,703 A | * | 10/1996 | Arledge et al. ............ 340/7.29 |
| 5,870,557 A | | 2/1999 | Bellovin et al. |
| 5,930,474 A | * | 7/1999 | Dunworth et al. .......... 709/217 |
| 6,038,593 A | * | 3/2000 | Huckins ................... 709/217 |

(Continued)

FOREIGN PATENT DOCUMENTS

CA    2244569    2/1999

(Continued)

OTHER PUBLICATIONS

Newton, Newton's Telecom Dictionary, 1998, Telecom Books, p. 606-607.

(Continued)

*Primary Examiner*—Chi Pham
*Assistant Examiner*—Ronald Abelson

(57) ABSTRACT

The present invention permits a network service provider to detect an operational condition—such as congestion—in a packet-switched network and to alleviate such congestion by providing customer incentives to avoid use of the network. The detection mechanism triggers an incentive such as the modification of the user's access charges and the customer can be immediately notified of either the occurrence of the congestion or of information regarding the incentive. Usage of the network during congested periods can be deterred by imposing additional access charges during such periods—similarly, customers can be given a discount to encourage usage during periods of low congestion. An incentive schedule can be tailored to dynamically change the usage patterns of the customers of the network to accommodate the operational conditions in the network. The present invention has application in the Internet, where a detection/notification mechanism, for example, can be implemented in a network node such as a router or in a network endpoint such as a client machine or a proxy or mail server.

15 Claims, 4 Drawing Sheets

U.S. PATENT DOCUMENTS

| | | | |
|---|---|---|---|
| 6,085,892 | A | 7/2000 | Lem et al. |
| 6,134,589 | A * | 10/2000 | Hultgren .................... 709/227 |
| 6,160,793 | A * | 12/2000 | Ghani et al. ................ 370/236 |
| 6,233,237 | B1 * | 5/2001 | Yucebay et al. ............ 370/384 |
| 6,253,248 | B1 * | 6/2001 | Nakai et al. ................ 709/237 |
| 6,275,471 | B1 | 8/2001 | Bushmitch et al. |
| 6,286,098 | B1 * | 9/2001 | Wenig et al. ................ 713/151 |
| 6,301,253 | B1 * | 10/2001 | Ichikawa ................ 370/395.71 |
| 6,304,574 | B1 * | 10/2001 | Schoo et al. ................ 370/401 |
| 6,353,596 | B1 | 3/2002 | Grossglauser et al. |
| 6,389,005 | B1 * | 5/2002 | Cruickshank ............... 370/352 |
| 6,408,003 | B1 | 6/2002 | Rezaiifar et al. |
| 6,438,101 | B1 * | 8/2002 | Kalampoukas et al. ..... 370/229 |
| 6,522,875 | B1 * | 2/2003 | Dowling et al. ......... 455/414.3 |
| 6,526,022 | B1 * | 2/2003 | Chiu et al. .................. 370/229 |
| 6,757,268 | B1 * | 6/2004 | Zendle ....................... 370/338 |
| 6,959,318 | B1 * | 10/2005 | Tso ............................ 709/203 |

FOREIGN PATENT DOCUMENTS

| | | |
|---|---|---|
| EP | 0 841 825 A2 | 5/1998 |
| EP | 0 899 916 A2 | 3/1999 |
| EP | 0 841 825 A3 | 4/2000 |
| EP | 0 899 916 A3 | 12/2001 |
| WO | WO 99 15978 A | 4/1999 |

OTHER PUBLICATIONS

"Congestion Avoidance and Control," V. Jacobson, *ACM SIGCOMM-88m*, Aug. 1988, p. 314-29.

"TCP Slow Start, Congestion Avoidance, Fast Retransmit, and Fast Recovery Algorithms", W. Stevens, *RFC 2581* (revision of RFC 2001) Jan. 1997.

"TCP and Explicit Congestion Notification", K. K. Ramakrishnan and Sally Floyd, *ACM computer Communication Review*, V. 24, N. 5, Oct. 1994, p. 10-23.

Murphy, Liam; Murphy, John; Mackie-Mason, Jeffrey K.; "Feedback and Efficiency in ATM Networks", 1996 IEEE Int. Conference on Communications, Conuerging Technologies for Tomorrow's Applications. Dallas, Jun. 23-27, 1996, IEEE Int. Conference on Communications, New York, IEEE, US vol. 2, Jun. 23, 1996 pp. 1045-1049.

W. Stevens et al; "RFC 2001: TCP Slow Start, Congestion Avoidance, Fast Retransmit, and Fast Recovery Algorithms" Network Working Group, Jan. 1997, pp. 1-6.

Ramakrishnan K. et al; "A Proposal to Add Explicit Congestion Notification (ECN) to IP"; Network Working Group, Jan. 1999, Chapters 61.2, 61.3.

\* cited by examiner

METHOD FOR REDUCING CONGESTION IN PACKET-SWITCHED NETWORKS

RELATED APPLICATION DATA

The present application is a continuation of U.S. patent application Ser. No. 09/292,024 filed Apr. 16, 1999 now abandoned, entitled METHOD FOR REDUCING CONGESTION IN PACKET-SWITCHED NETWORKS.

FIELD OF THE INVENTION

The present invention relates to communication networks and, more particularly, to methods and systems for reducing congestion in a packet-switched or hybrid network.

BACKGROUND OF THE INVENTION

With the explosive growth of today's information superhighway have come the inevitable traffic jams. Congestion is a serious problem today on the Internet, a worldwide system of computer networks using packet-switching technology to transfer messages between computers. Packet-switching protocols such as the Transmission Control Protocol/Internet Protocol (TCP/IP) divide messages into packets which travel along a path in the network that can be varied as conditions in the network change. Specifically, TCP/IP, as currently implemented in the Internet, routes packets independently of each other, utilizing its best efforts without any specific concept of a "connection." Accordingly, in the Internet, there is little notion of "quality of service", no notion of guaranteed throughput, and no notion of bounded transmission delay.

Current implementations of TCP/IP rely on packet loss as an indicator of congestion in the network. As the network experiences congestion, data flowing through a network router becomes bottlenecked in a queue until the queue overflows and packets are lost. Load reduction is accomplished by utilizing a well-known "congestion avoidance" algorithm first described by Van Jacobson in 1988. See "Congestion Avoidance and Control," V. Jacobson, ACM SIGCOMM-88, August 1988, p. 314–29; "TCP Slow Start, Congestion Avoidance, Fast Retransmit, and Fast Recovery Algorithms," W. Stevens, RFC 2581 (revision of RFC 2001), which is incorporated by reference herein. In what is coined a "slow start", a TCP source begins inserting packets into the network by starting with a minimal congestion window, allowing at most one unacknowledged packet in the network. Each time an acknowledgement (ACK) is received, the congestion window is enlarged exponentially until a first threshold is reached or until a packet is dropped. If the first threshold is reached, the TCP source continues to enlarge the congestion window linearly until either a second threshold is reached—or until a packet is dropped. Upon the timeout of a retransmit timer (thereby indicating a dropped packet), the TCP source reduces the transmission rate and "backs off" to its minimal window, with the goal of allowing the network to reach some form of equilibrium.

As traffic on the Internet increases and more applications are run which are sensitive to the delay caused by dropped packets (e.g. streaming audio and video), proposals have emerged to add some form of explicit congestion notification (ECN) to TCP. See "TCP and Explicit Congestion Notification", ACM Computer Communication Review, V. 24 N. 5, October 1994, p. 10–23; "A Proposal to add Explicit Congestion Notification (ECN) to IP", K.K. Ramakrishnan and Sally Floyd, RFC 2481, which is incorporated by reference herein. For example, a network router with a queue nearing an overflow, rather than merely waiting for a packet to drop, can transmit a signal (in the form of a special bit in the packet's header) to indicate the presence of network congestion. The receiver's acknowledgment packet passes the notification on to the sender, which in turn slows down its transmission rate.

These methods of controlling congestion by signaling for a reduction in transmission rate, however, do not address the root problem—namely, insufficient transmission capacity to support the explosive growth in the number of users demanding access to the Internet at the same time. Short of increasing the capacity of the network, these methods of addressing congestion can make performance degradation more gradual, but they cannot prevent it altogether. It would be preferable to establish a system that reduced congestion in the network by affecting the network usage habits of the people accessing the Internet, and thereby directly addressing the problem of overrunning the capacity of the network.

SUMMARY OF THE INVENTION

The present invention permits a network service provider to detect an operational condition—such as congestion—in a packet-switched network and to alleviate such congestion by providing customer incentives to avoid use of the network. The detection mechanism triggers an incentive such as the modification of the user's access charges and the customer can be immediately notified of either the occurrence of the congestion or of information regarding the incentive. Usage of the network during congested periods can be deterred by imposing additional access charges during such periods—similarly, customers can be given a discount to encourage usage during periods of low congestion. An incentive schedule can be tailored to dynamically change the usage patterns of the customers of the network to accommodate the operational conditions in the network. The present invention has application in the Internet, where a detection/notification mechanism, for example, can be implemented in a network node such as a router or in a network endpoint such as a client machine or a proxy or mail server.

These and other advantages of the invention will be apparent to those of ordinary skill in the art by reference to the following detailed description and the accompanying drawings.

DETAILED DESCRIPTION

Figure 1:
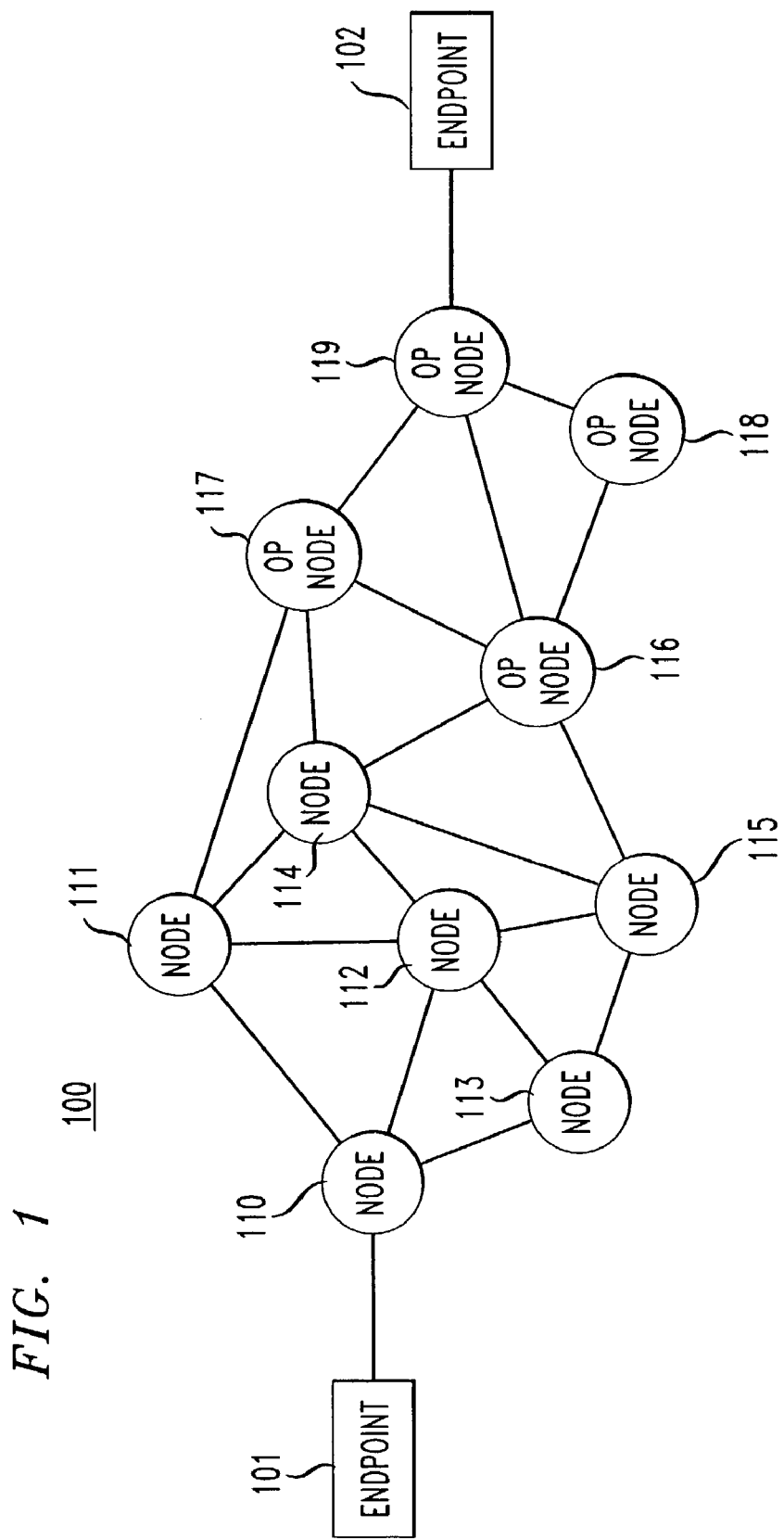
FIG. 1 is a block diagram of a packet-switched network illustrating an embodiment of the present invention.

The present invention is illustrated with reference to FIG. 1 which shows a packet-switched network 100 having numerous packet-switching nodes 110 to 119 connecting endpoints 101 and 102. Endpoint 101 and nodes 110 to 115 are assumed to be under the control or supervision of a network service provider; the remainder of the network is assumed to be controlled or maintained by other providers or entities. The network service provider provides access for users to the network for an access charge. For example, where the network 100 is the Internet, an Internet Service Provider ("ISP") such as AT&T WorldNet™ provides access to the Internet for its customers. In the case of the Internet, 110 to 115 represent routers and endpoints, 101 and 102 can be client machines, servers, proxy servers, mail servers, news servers, etc. FIG. 1, of course, is a simplification as a typical communication network would encompass other network elements that would be apparent to one of ordinary skill in the art. Furthermore, although the discussion below focuses on service providers, one of ordinary skill would easily recognize that the present invention applies equally to other network entities such as, for example, corporate networks that utilize charge-back schemes.

In accordance with the present invention, operational conditions such as congestion in the network are detected in a network node 110 to 115 and/or at an endpoint 101 in the network under the control of the network service provider. Upon the detection of the condition, whether at a router or an endpoint, the present invention generates incentive information, such as billing records reflecting a reduction or an increase in the access charge paid by a particular user. This information can be relayed to a billing server or some other billing apparatus for processing. A notification mechanism permits the user to receive notice of the incentive, either by notifying the user of the presence of the operational condition (e.g. congestion) or of the incentive information (e.g. the modified access charge).

Figure 2:
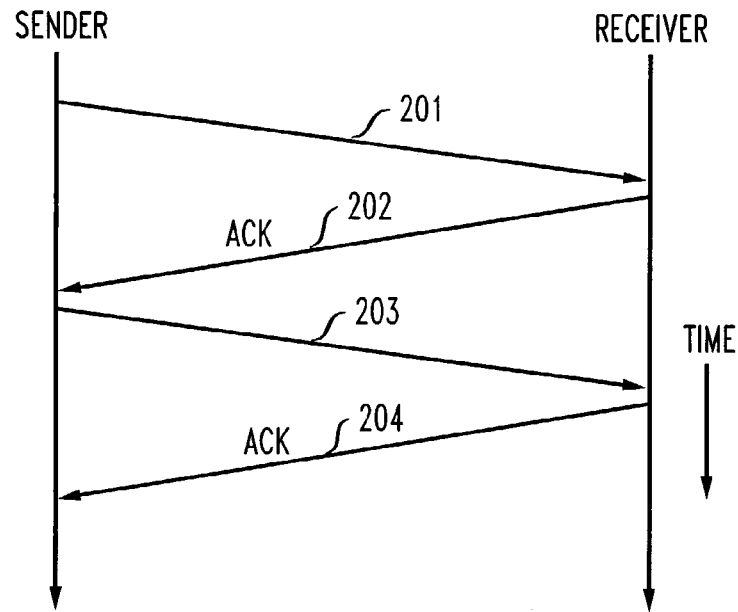
FIG. 2 is a diagram showing the movement of illustrative packets in a packet-switched network between a sender and a receiver as a function of time.

The specific detection mechanism will depend on the particular operational condition in the network sought to be detected as well as the protocols that can be used in the network to signal the condition. For example, each node 110–115 is customarily equipped in a packet-switched network with a large number of buffers for storing packets in anticipation of routing or awaiting availability of an output link. With regard to packet congestion, such symptoms develop first in the node's buffers or queues, as the buffers become filled and unavailable to store incoming packets. Thus, a router knows that the Internet is getting congested because its buffer queue for some output link is too long or is getting too long. Some routers today utilize a mechanism called Random Early Detection ("RED") which signals the presence of congestion as it develops by dropping packets when the average queue length exceeds some threshold—rather than waiting for the queue to actually overflow. See RFC 2309, which is incorporated by reference herein.

Where endpoint 101 is a sender of packets across the network, see FIG. 2, it will also be aware of the congestion developing in the router's buffers. Endpoint 101, using TCP/IP, expects to receive an ACK 202 after transmitting a packet 201 through the network. Failure to receive an ACK signifies that the packet has been dropped by some router between it and the destination endpoint 102. Where, however, endpoint 101 is a receiver of packets (and endpoint 102 is, accordingly, the sender), the situation is a bit more subtle. The TCP process layer at endpoint 101, as it receives the packets 201, 203, etc. sent by 102, knows the order in which to reassemble the packets based on a sequence number in the received packets' headers. Endpoint 101, thus, expects to receive the packets in a certain order and can infer the dropping of a packet by looking for "holes" in the packets' sequence numbers. An out-of-sequence packet, especially if there is a significant delay before the hole is filled, in general indicates that the expected packet has been dropped due to congestion. This method does not guarantee absolute detection of every dropped packet since, for example, packet loss will be invisible to the receiver if the trailing packet/packets in a sequence are dropped. Nevertheless, the method statistically provides good detection of dropped packets, especially for long transmissions (which is the situation a network service provider would be the most concerned about). Alternatively, the endpoint could use duplicate packets as an indicator, although the method would not be expected to be as good as a method based on detecting a hole and a timeout.

The situation is simplified if the network has ECN capabilities. In that case, where the router experiences congestion in its buffers (whether by a buffer overflow or by RED), it sets a "Congestion Experienced" ("CE") bit in the packet header of packets from ECN-capable transport protocols. See RFC 2481. The receiver of the packet detects the CE bit and sets a "ECN-Echo" flag in the header of a subsequent ACK packet sent back to the sender. Endpoints 101 and 102 are thus quickly notified of the congestion condition in a router and can react accordingly.

The above detection mechanisms have been described with respect to the Internet protocol suite although, as noted above, the present invention works with applications and protocols other than reliable data transfer over TCP (as well as non-TCP/IP networks such as Ethernet, hybrid networks, etc.). For example, the instant methods of congestion-based incentives work with multicast communication as well as unicast communication. Consider a multicast audio application that runs over RTP/UDP (the Real Time Protocol over the User Datagram Protocol). In multicast audio, a sender transmits a stream of packets containing audio samples to multiple receivers. These applications do not require that every audio sample be reliably delivered, but they do require some reliability in order to maintain acceptable audio quality. RTP in particular uses sequence numbers to order packets and detect losses at each receiver. A lost RTP packet signals congestion just as a lost TCP packet does. RTP packets can also arrive at a receiver, in principle, containing an ECN (Explicit Congestion Notification) signal placed there by the network. Furthermore, RTP receivers send periodic reports back to RTP senders. Senders use these reports to monitor communication quality and possibly adapt their behavior when there are problems. RTP reports include loss information, just as TCP acknowledgements do. Report packets can also carry ECN-Echo signals back to the sender. Therefore, both implicit and explicit congestion signals can be used in the context of the present invention as already described above.

To see how the present invention can be implemented in a real-world setting such as the Internet, it is necessary to understand the typical operating environment. About 70 to 75% of the traffic in the Internet today utilizes the Hypertext Transfer Protocol (HTTP), i.e., Web page retrieval. Furthermore, most congestion in the case of HTTP will occur on user-bound packets, since that is the direction of most Web traffic. Some users connect directly to the Web server of interest; others go through what are known as proxy servers. Often operated by network service providers, a proxy server acts as an intermediary between a user terminal and the Internet to provide caching services. By caching frequentlyrequested pages, a proxy server can reduce the bandwidth necessary for the provider's own connection to the outside world. The present invention, then, should handle the case of both direct and proxy connections to the outside world, especially (but not exclusively) for Web traffic.

Figure 3:
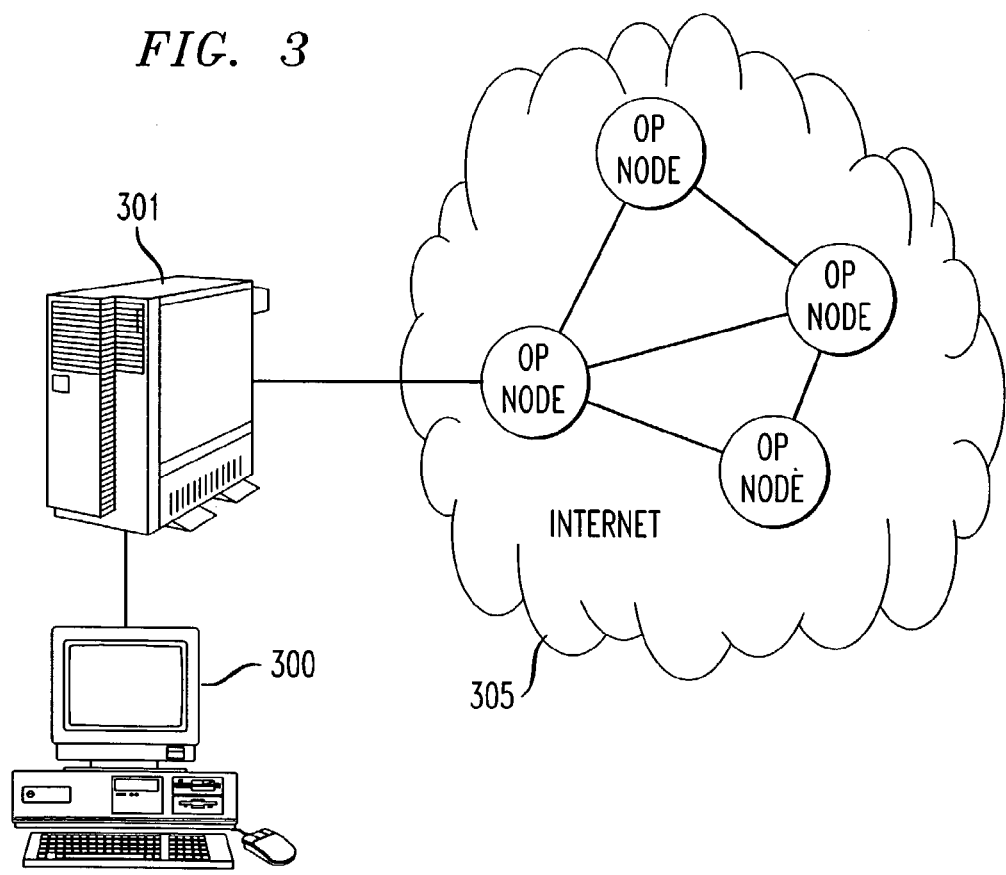
FIG. 3 is a block diagram of a packet-switched network and a proxy server illustrating another embodiment of the present invention.

First, consider the case of a user of a proxy server. With reference to FIG. 3, proxy server 301 receives a request from the user 300 for an Internet service (e.g. a Web page request from server 302) which the proxy server forwards through the Internet 305 using its own IP address—assuming the request passes filtering requirements and cannot be satisfied by the internal cache. When the proxy server receives the requested page, it relates it to the original request and forwards it back to the relevant user. A proxy server, as a receiver of packets from outside Web servers, can use the present invention to detect congestion in the network and attribute it to the customer who requested the specific Web page. It is also a sender on the provider's own network; this, too, can be noted appropriately. The proxy server is thus perfectly positioned to detect and charge for requests over congested networks. The same analysis holds for operator-provided e-mail and, to a certain extent, news servers maintained by the operator. When sending or receiving mail on behalf of a given customer, operational conditions internal and external to the network can be detected, noted, and billed accordingly. (It should be noted, however, that there could be philosophical problems with regard to the application of the present invention to the receipt of unsolicited mail during periods of congestion; see the discussion below on service-level congestion.)

Figure 4:
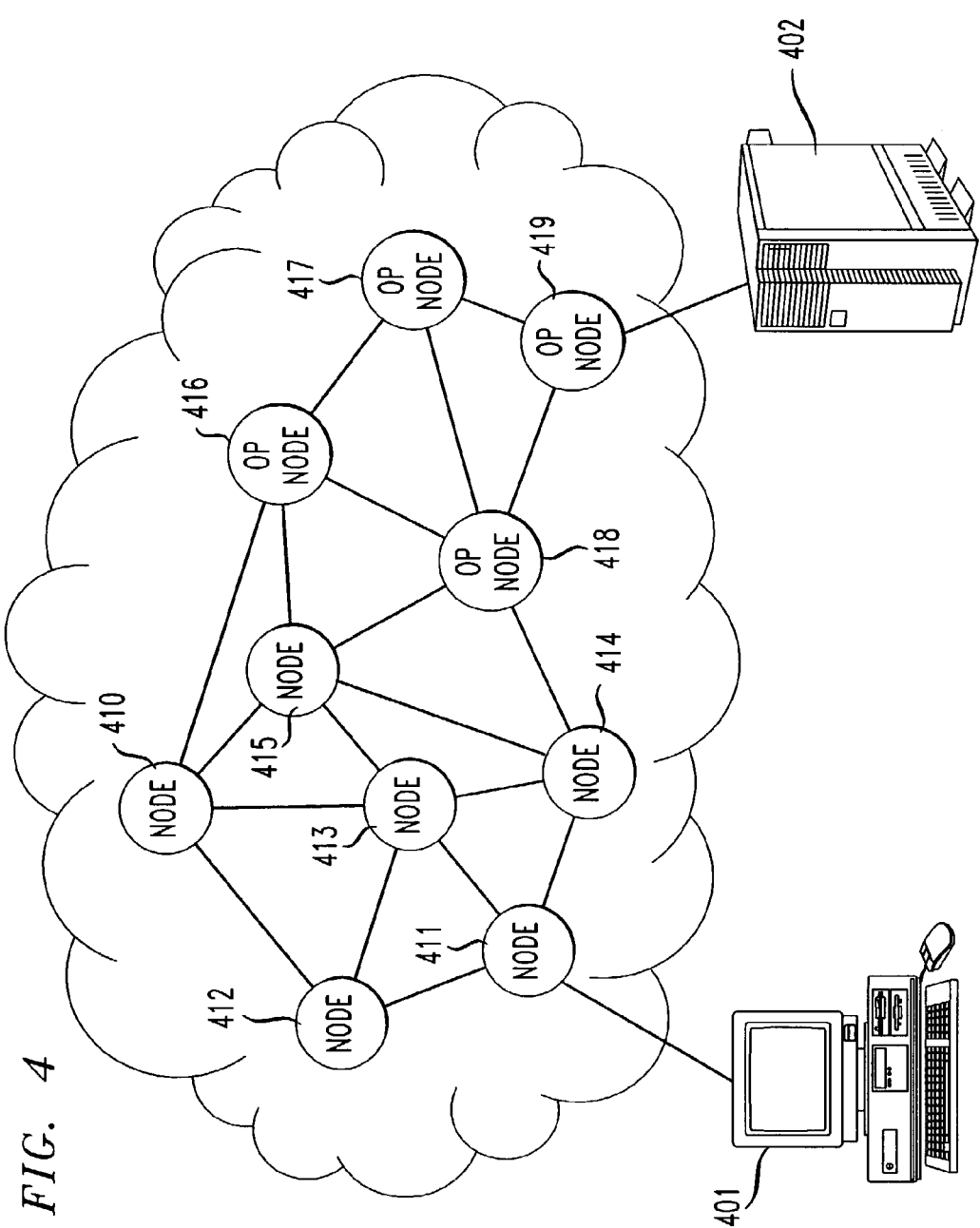
FIG. 4 is a block diagram of a packet-switched network illustrating another embodiment of the present invention.

Suppose, though, that the user does not utilize a proxy server and is connecting directly to the Internet, whether for Web-browsing or something else. See FIG. 4. In this case, the end systems that detect the congestion most easily are the customer's machine 401 and some endpoint 402 not under control of the network operator. While the former is ideally placed to notify the user, it clearly cannot be trusted to generate charge records for purposes of billing. Under certain circumstances, it may be possible to gather data reliably, such as when the customer utilizes a tamper-resistant modem supplied by the network operator. Otherwise, the routers 410 to 415 in FIG. 4 operated by the network service provider should be used to detect congestion and gather the data necessary to generate the appropriate billing records.

The only case not covered, then, is when congestion occurs, but on a router not under the control of the local network operator, i.e. routers 416 to 419. Arguably, this is not a matter of local concern, since the local network operator is not paying for the bandwidth. There is a situation of interest, however—namely, when the router detecting the congestion is at the other side of a comparatively slow link between the local network operator and an upstream service provider. There are two possible ways to overcome the problem: First, the local operator can provide the routers for both ends of the slow link. At the upstream end, a fast link can connect to the local provider's router; this, then, reduces to the previous case. Alternatively, by contractual arrangement the upstream provider can detect and record congestion on behalf of the local operator. This situation can be generalized. Network service providers can detect congestion attributable to other customers of other network operators, and notify and bill them appropriately. A special-purpose "congestion indication protocol" can be utilized to pass the information between network operators. Accordingly, all users of an upstream provider can be charged for the congestion that they cause, rather than trying to attribute the problem to individual users.

Clearly, notifying the users of the incentive is important: if users do not realize there is a problem in the network (and a surcharge/reward), they will not modify their behavior at appropriate times. Direct notification from the network provider is straightforward where the present invention is implemented as a user process running on a direct endpoint capable of detecting congestion. With other configurations, other mechanisms for notifying the customer can be utilized. For example, when the user is in contact with only some local server, service-specific mechanisms can be utilized. When the customer is accessing Web pages through a proxy, a Java or Javascript applet can be sent to the user in the first Web page retrieved which, in turn, displays to the user the relevant notifications regarding congestion and incentive information such as the effect on access charges. Similarly, the mail retrieval protocol could be modified to send appropriate information to the customer when accessing a mail server to check the user's e-mail (or create a new e-mail).

Figure 5:
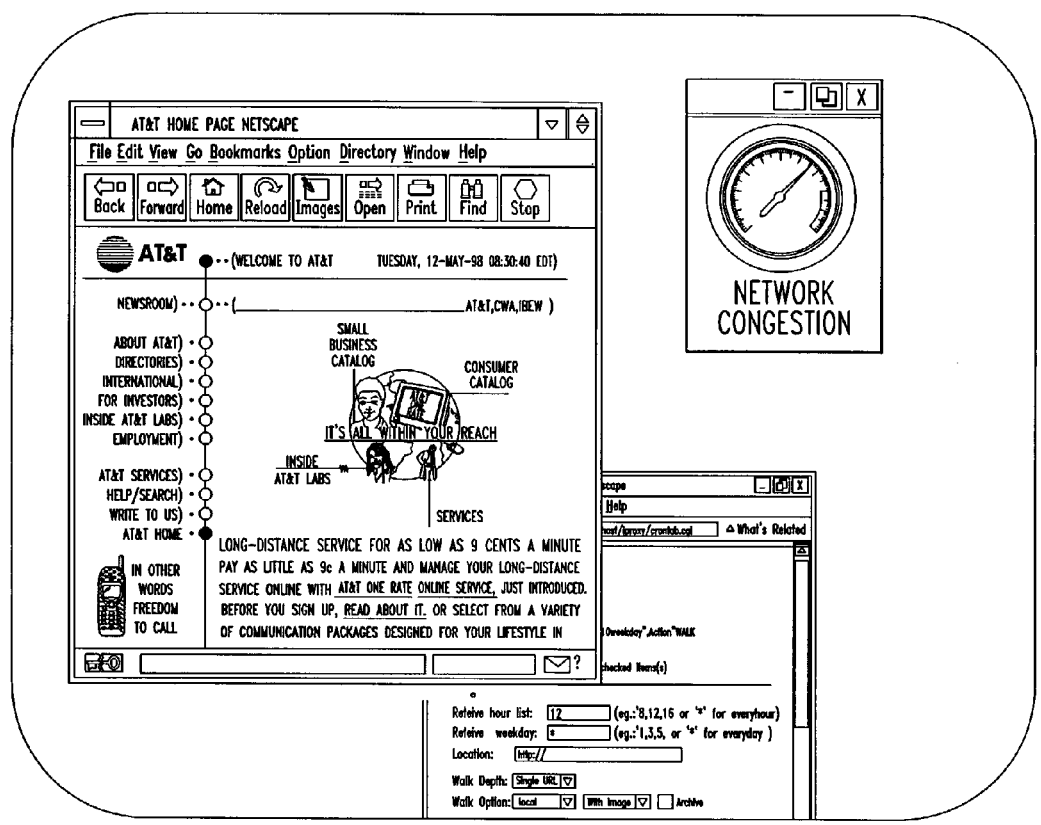
FIG. 5 is a diagram of a user display with a popup window in the upper right hand corner of the display showing information regarding congestion in a packet-switched network.

The notification can be in the form of a window or screen "popup" on the user's display. A small window could be displayed on the user terminal indicating the level of congestion in the network in some visually intuitive and appealing form such as a speedometer. See FIG. 5. Moreover, other forms of notification can come from preemptive detection mechanisms. In commonly assigned U.S. Pat. No. 5,870, 557, "Method for Determining and Reporting a Level of Network Activity on a Communications Network Using a Routing Analyzer", the disclosure of which is incorporated by reference herein, a method is disclosed for periodically analyzing the congestion along routes from an access provider's entry point to the Internet to a set of desired Web sites. Round trip times and packet loss information collected from use of the "traceroute" command are utilized to identify congested links. The transit characteristics are compiled and analyzed to provide a user with useful information about congestion along routes to the Web sites of interest and in order to warn users to avoid traffic to some Web sites at congested periods of time. Such preemptive mechanisms can be utilized with the present invention to provide a customer with prior information on the operational condition of the network before incurring any charges for usage of a congested link. Accordingly, a customer can be prompted before deciding to access the network in a manner that will generate any incentive information such as a modification to a customer billing record.

Moreover, it should be apparent from the above example that the notification mechanism need not be coupled to the network's detection and incentive mechanisms. Self-notification mechanisms can be utilized by the user. As long as users have received some notice of the general contours of the incentive, perhaps at registration, they can utilize whatever local detection/notification application scheme on their own computer terminal they choose to, such as the preemptive reporting application described above. The network service provider need only concern itself with detecting congestion and detecting usage.

The present invention has been described with respect to the operational condition of the network itself. Rather than focusing on a condition such as network congestion, the idea can be generalized to encompass "service" or "application-level" congestion, i.e. congestion as an attribute of a service or application as opposed to a network. The incentive information can be generated as a function of some condition of a service/application provided by the network operator to the customer.

For example, it is known that the load on e-mail servers increases near Christmastime, as users send each other holiday greetings laden with graphics and audio. See "Graphic-Laden Holiday Greetings Clog Servers at AT&T WorldNet", Wall Street Journal, Dec. 10, 1998. As the added multimedia makes the messages much larger than regular text e-mail, the mail servers become overloaded resulting in significant slowdowns in the delivery of incoming and outgoing mail. The present invention can be utilized to detect the increasing load on the mail server and to notify and charge customers submitting large messages during such periods of service congestion. Similarly, receiving and storing certain high-volume newsgroups can be a considerable burden on a network operator trying to maintain a news server for its customers. Users who access such newsgroups by reading or posting to them could be notified and billed accordingly.

Service congestion detection can be accomplished by modifying the mail protocol or the netnews protocol. Where a change in the protocol is undesirable, fake congestion indicators can be generated. While artificially dropping packets in order to signal service-level congestion would be counterproductive, an ECN congestion bit can be set to notify the user of the service-level congestion. This scheme will work for any application where most of the data is sent from the server to the user, since it will then have a minimal effect on actual transmission speeds.

Although the embodiments of the present invention are described with respect to the Internet, it would be easily recognized by one of ordinary skill in the art that the present invention is applicable to packet-switched networks in general. The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method, for use by a network access service provider to alleviate an undesired operational condition in the network, said method comprising the steps of:
   detecting the undesired operational condition in a tamper-resistant modem at a network endpoint, the tamper-resistant module supplied by the network access service provider for generating billing data;
   determining current usage of the network by a customer by evaluating billing data from the tamper-resistant modem; and
   providing a financial incentive to the customer already on the network to use the network at another time when the undesired operational condition is not present.

2. The method of claim 1 wherein the financial incentive is a modification in an access charge collected by the network access service provider from the customer.

3. The method of claim 1, wherein the undesired operational condition is congestion in the network.

4. The method of claim 3 wherein congestion is detected by determining that a packet has been dropped in the network.

5. The method of claim 3 wherein congestion is detected by determining that the tamper-resistant modem at the network endpoint has failed to receive an acknowledgment in reply to sending a packet.

6. The method of claim 3 wherein congestion is detected by determining that the tamper-resistant modem at the network endpoint has received a packet out of sequence.

7. The method of claim 3 wherein congestion is detected by determining the size of a buffer queue of the tamper-resistant modem at the network endpoint.

8. The method of claim 3 wherein congestion is detected by determining that a packet has been marked by explicit congestion notification.

9. The method of claim 1 further comprising the step of:
   providing an access charge discount incentive notification to the customer already on the network to use the network at another time when the undesired operational condition is not present.

10. The method of claim 1 further comprising the step of:
    providing an access charge premium dis-incentive to the customer already on the network in order to allow the customer to use the network when the undesired operational condition is present.

11. The method of claim 1 wherein the network is a packet-switched network.

12. The method of claim 1 wherein the network is a hybrid network.

13. The method of claim 11 wherein the network uses the Internet protocol suite.

14. The method of claim 11 wherein the network uses a multicast communication protocol.

15. The method of claim 11 wherein the network is the Internet.

* * * * *